Dec. 14, 1926.  
W. THORNLEY  
1,610,901  
CIRCUIT CLOSER FOR DIRECTION SIGNALS FOR AUTOMOBILES  
Filed June 27, 1922   2 Sheets-Sheet 1
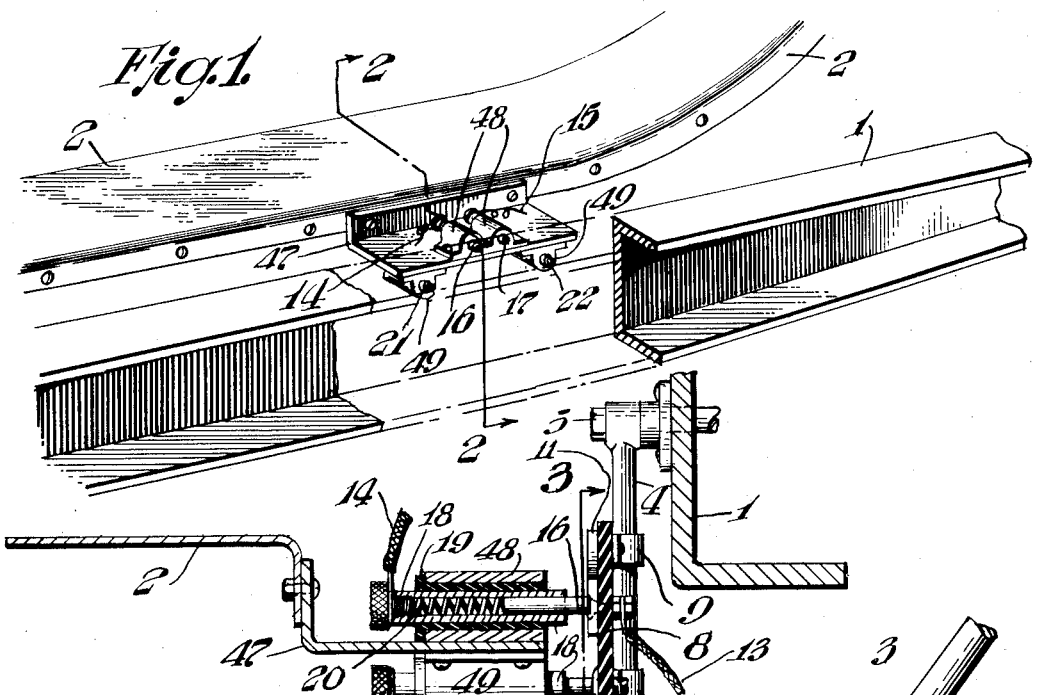
INVENTOR:  
William Thornley  
BY  
Niedersheim Fambart  
ATTORNEYS.

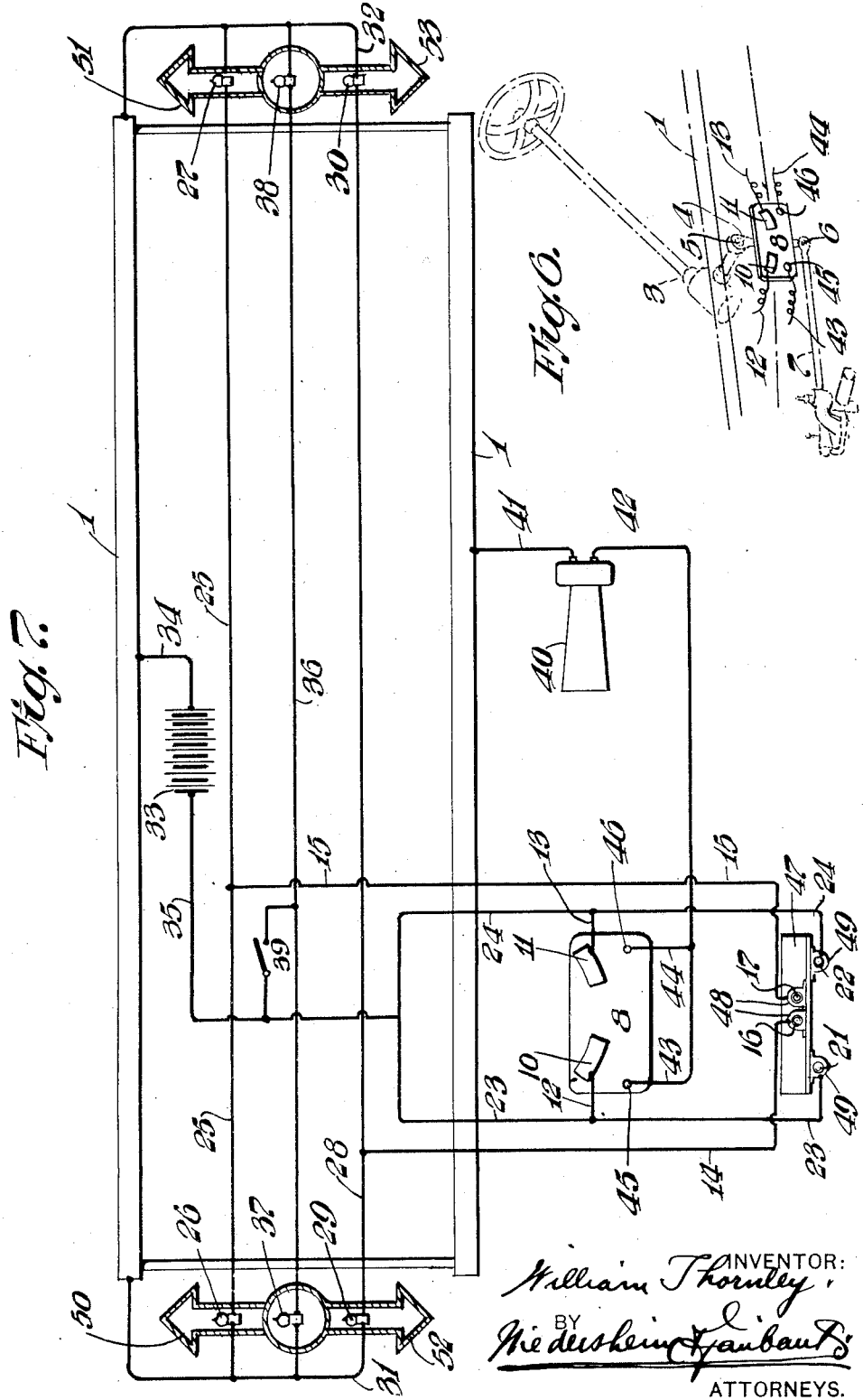

Patented Dec. 14, 1926.

1,610,901

UNITED STATES PATENT OFFICE.

WILLIAM THORNLEY, OF LAUREL SPRINGS, NEW JERSEY, ASSIGNOR TO IDEAL SYNDICATE, OF CAMDEN, NEW JERSEY, A FIRM COMPOSED OF WILLIAM THORNLEY, JAMES W. ROSS, EVI TALMAGE, AND BENJAMIN C. HENION.

CIRCUIT CLOSER FOR DIRECTION SIGNALS FOR AUTOMOBILES.

Application filed June 27, 1922. Serial No. 571,213.

My invention consists of a novel construction of an electric direction signal particularly adapted for automobiles, and which is adapted to be attached to any standard or conventioal type of car or steering mechanism therefor without any change or dismantling of the same, whereby as the driver or chauffeur rotates the hand wheel of the steering column in the desired direction, there will be automatically indicated at the front and rear of the vehicle, the direction which the automobile is about to take in turning to the right or to the left, so that parties in the front of the car, as well as in the rear thereof, may know whether the car equipped with my invention is going to continue its direction of travel in a straight line or is going to turn a corner in either direction.

In carrying out my invention, I attach to the pitman arm of any conventional automobile steering mechanism, an insulated plate having contacts thereon, from which electrical connections lead to front and rear right and left electric lights, said contacts being adapted through the medium of juxtaposed brushes to close a circuit controlling or illuminating either the right or the left front and rear lights, according to whichever direction the automobile is to turn, said lights being out or unilluminated, when the car is travelling in a straight path.

It further consists of a novel construction and manner of mounting the sliding brushes and their adjuncts, which are adapted to be suitably attached to a fender or other portion of the car and to contact with the contacts on said insulated plate carried by the pitman arm of the steering mechanism, when the steering wheel is turned in either direction.

It further consists of a novel construction of other contacts also mounted on the insulated plate carried by the pitman arm and adapted to close an electric circuit by another set of brushes controlling the horn circuit, whereby simultaneously with the illumination of the right or left front or rear lights, according to whichever direction the driver in turning, the horn will be automatically audibly sounded without requiring any attention on the part of the operator.

It further consists of a novel construction of supporting devices for the upper and lower pairs of sliding brushes, whereby the front and rear light circuit on either side and the horn circuit are closed at the proper periods, all the parts constituting my invention being of a simple construction and not liable to get out of order and being capable of being readily attached to any standard or conventional type of automobile body and steering mechanism without requiring skilled labor, the device being reliable and automatic in its operation and fool-proof under all conditions.

It further consists of other novel features of construction, all as will be hereinafter fully set forth.

For the purpose of illustrating my invention, I have shown in the accompanying drawings certain forms thereof which are at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a portion of the fender and frame of an automobile showing the two sets of sliding brushes which control the front and rear electric light circuits and the horn circuit, a portion of the frame being cut away for the sake of clearness of illustration.

Figure 2 represents a section on line 2—2 Figure 1, showing the pitman arm of the steering mechanism with the insulating plate attached thereto and an upper and lower brush coacting therewith.

Figure 3 represents a section on line 3—3 Figure 2, showing the general connection from the steering column to the pitman arm and its adjuncts, said pitman arm carrying the insulated plate and the contact devices thereon comprising my invention.

Figure 4 represents on an enlarged scale a front view of the supporting means for the upper pair of sliding brushes which control the front and rear electric light circuits and the lower pair of sliding brushes which control the horn circuit.

Figure 5 represents a section on line 5—5 Figure 3, showing the manner of attaching the insulated plate and its adjuncts to the pitman arm of the steering mechanism.

Figure 6 represents a perspective view showing in dotted lines a portion of a conventional steering mechanism having my invention as shown in full lines applied thereto.

Figure 7 represents a diagrammatic view of a wiring diagram embodying my invention showing the front and rear electric light circuits, the horn circuit and their controls.

Similar numerals of reference indicate corresponding parts.

Referring to the drawings:—

In carrying out my invention, which is adapted to be supported from the fender or frame of any standard or conventional type of car having a steering gear of standard construction, without any alteration of these standard parts, I have designated the frame as 1, the fender as 2 and the steering gear as 3, these parts being of any usual standard type.

4 designates a pitman arm pivotally supported from the frame 1 at the point 5, and operatively connected to the gearing at the lower end of the steering column, as will be understood from Figure 6. To the lower end of said pitman arm is pivotally connected at the point 6, the drag arm 7, which is suitably connected in the usual manner to the front wheel steering mechanism.

8 designates an insulating plate which has a pair of straps or clips 9 secured thereto, which encircle the pitman arm 4, see Figs. 3 and 4, said plate having secured to the upper portion thereof the contacts 10 and 11, from which lead the wires 12 and 13 respectively to the wires 23 and 24, (see Fig. 7), whose terminals are electrically connected to the lower brushes 21 and 22.

I have shown in Fig. 6, in dotted lines a conventional form of steering gear, and in full lines in said figure, the parts constituting my invention are applied thereto.

The pendant pitman arm 4 has an oscillating or to and fro movement to the right or the left of the position seen in Fig. 3, according as the steering wheel and its adjuncts are rotated, and it will be apparent that the insulated plate and its contacts 10 and 11 move as a unit with said pitman arm 4, so as to bring either the contact 10 against the brush 16 or the contact 11 against the brush 17, to thereby close the respective circuits, according as the car is directed to the right or left, it being apparent that when the car is proceeding in a straight path, the relative position of the upper brushes 16 and 17 to the contacts 10 and 11 will be as seen in Fig. 3 and the circuit will be open.

The brushes 16 and 17 are arranged in horizontal alignment substantially as seen in Figs. 1, 3 and 4 and are mounted in any suitable housing, such as sleeves of conductive material, as indicated at 18 in Fig. 2, the said sleeves being mounted in insulated bushings 19. The sleeves 18 are provided with suitable binding posts, whereby the electrical connections are properly made, as will be understood from Fig. 2. Each of the brushes 16 and 17 is slidably mounted in its sleeve 18 and at the rear thereof is provided with a suitable spring or tension device, as 20, seen in Figure 2, so that the proper contact can always be had between a brush and its contact 10 or 11.

Below the pair of upper brushes 16 and 17, I locate the lower brushes 21 and 22, which are mounted in conductive sleeves surrounded by a suitable insulation of the character seen in Fig. 2, said brush 21 being electrically connected with the wire 23, and the brush 22 being electrically connected with the wire 24. The wire 15 leads from the upper brush 17 to the wire 25, which is electrically connected to the right-hand front light 26 and to the right-hand rear light 27. The wire 14 leads from the upper brush 16 to the wire 28, which is connected to the left-hand front light 29 and to the left-hand rear light 30. From the light 29 leads the wire 31, which is connected to the wire 25, and to the frame 1, while the light 30 leads the wire 32, which is electrically connected to the frame 1 and also to the right-hand rear light 27.

33 designates a battery and the wire 34 leads therefrom to the frame 1 and the wire 35 leads therefrom to the wires 23 and 24.

36 designates a wire which is connected to the front central light 37 and the rear central light 38, said lights 37 and 38 being electrically connected with the wires 31 and 32, as will be apparent from Fig. 7.

39 designates a switch, one member of which is connected to the line 36 and the other member to the line 35, said switch being attached to the brake.

40 designates an electric horn, which is electrically connected by the wire 41 to the frame 1 and by the wire 42 to the connections 43 and 44, which lead to the contacts 45 and 46 respectively, which are carried upon the insulated plate 8, and are preferably arranged in horizontal alignment below the contacts 10 and 11 and at a greater distance apart than the latter, as will be understood from Fig. 3.

It will thus be seen from the foregoing that I have provided a front right and left-hand light and a rear right and left-hand light, the construction and mode of operation being such that the front and rear right-hand lights 26 and 27, or the front and rear left-hand lights 29 and 30, will be simultaneously illuminated according as the automobile is turned to the right or the left, and in case the automobile is proceeding in a straight path, neither of said lights will be illuminated.

The operation is as follows:—

If the steering wheel is turned in the direction to move the pitman arm 4 for example to the left of the position seen in Figure 3, the plate 8 will move in unison therewith and the contact 11 will contact with the brush 17 and the electric light circuit controlled by the wires 13, 15 and 25 will be closed and the front and rear right-hand lights 26 and 27 therein will be illuminated, indicating to parties in the front and rear that the automobile is turning to the right.

If the steering gear is turned in the opposite direction, the contact 10 will be brought into contact with the brush 16, thereby closing the circuit controlled by the wires 12, 14 and 28 and illuminating the front and rear left-hand lights 29 and 30 in said circuit. Substantially simultaneously with the last-mentioned movement, that is, the closing of the circuit by the brush 16 and the contact 10, the circuit between the points 21 and 45 will be closed, whereupon the horn 40 will be automatically sounded, it being apparent that when the circuit between the points 11 and 17 is closed, substantially simultaneously therewith the circuit between the points 22 and 46 will be closed, so that the horn will be automatically sounded while the automobile is making a turn either to the right or the left.

It will be apparent that the upper pair of brushes 16 and 17 in conjunction with the contacts 10 and 11 control the front and rear electric light circuits, while the lower pair of brushes 21 and 22 in conjunction with the lower pair of contacts 45 and 46 control the horn circuit.

It will be clear that in the installation of my invention, it is only necessary for the operator to secure the insulating plate 8 carrying the contacts 10, 11, 45 and 46 to the pitman arm 4 by means of the straps or clips 9, and, in addition, to install the housing seen in Fig. 4 containing the upper brushes 16 and 17 and the lower brushes 21 and 22, which can be readily attached to the fender 2 in any suitable manner, so that when the insulating plate 8 moves in either direction in unison with the steering gear, the contact will be made, or, in other words, the circuit will be closed between the points 10 and 16 and 45 and 21, or between the points 11 and 17 and 46 and 22. The two pairs of brushes 16 and 17 and 21 and 22 can be supported in any suitable form of housing, but I have shown in Figs. 1 and 4 a convenient type of housing composed of an angle plate 47 and the upper pair of boxes 48 for the upper brushes and the lower pair of boxes 49 for the lower brushes, which has been successfully used in practice. The front and rear right-hand electric lights 26 and 27 can be mounted in transparent arrow-shaped casings, as 50 and 51, and the front and rear left-hand lights 29 and 30 can be mounted in similarly shaped casings, as 52 and 53, to indicate the desired direction.

The switch 39 is connected to the brake pedal by any suitable means (not shown), whereby the actuation of the brake pedal in putting on the brake closes the switch and its circuit and lights the central lights 37 and 38, said lights going out when the brake is released.

It will be apparent that by my invention the operator of the automobile is relieved from the necessity of putting his hand out of the side of the automobile to indicate to the traffic the direction he intends to take, since he can keep both hands upon the steering wheel at a time when is is necessary and desirable to employ two hands in making a turn, since my novel mechanism will automatically indicate to parties in both the front and rear, the direction which the automobile is to take.

It will further be apparent that my device will not mar the lines of automobiles now on the market, but can be readily installed upon inconspicuous points of any machine of any standard or conventional type.

Having thus described my invention, what I claim as new and desire to secure by Letters Patent is:—

1. The combination with a motor vehicle having steering mechanism including a rocking pitman arm, of an insulating plate secured to the pitman arm and movable in unison therewith, a pair of upper brushes and a pair of lower brushes fixed to a stationary portion of the vehicle adjacent said plate, and a pair of upper and a pair of lower contacts on said plate coacting with said brushes.

2. The combination with a motor vehicle having steering mechanism including a rocking pitman arm, of a housing fixed to the stationary portion of the vehicle and containing an upper pair and a lower pair of spring pressed brushes, a plate fixed to and movable with the pitman arm, and a pair of upper and a pair of lower contacts on said plate and coacting with said upper and lower brushes.

3. In a direction signal for automobiles, a housing comprising an angle plate having means for attaching the same to an automobile fender, a pair of upper and lower boxes secured thereto, spring pressed brushes in said boxes and insulated therefrom, a pitman arm actuated by the steering mechanism of the automobile, an insulating plate secured to said pitman arm and movable in unison therewith, and upper and lower contacts on said plate coacting with said brushes.

WILLIAM THORNLEY.